(12) United States Patent
Sano et al.

(10) Patent No.: US 10,707,668 B2
(45) Date of Patent: Jul. 7, 2020

(54) FLAT CABLE WINDING DEVICE AND FLAT CABLE ROUTING STRUCTURE

(71) Applicant: YAZAKI CORPORATION, Tokyo (JP)

(72) Inventors: Hikaru Sano, Shizuoka (JP); Goro Nakamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/548,795

(22) Filed: Aug. 22, 2019

(65) Prior Publication Data

US 2020/0099214 A1 Mar. 26, 2020

(30) Foreign Application Priority Data

Sep. 26, 2018 (JP) ................. 2018-180549

(51) Int. Cl.
*H02G 11/02* (2006.01)
*B60R 16/02* (2006.01)
*H01B 7/08* (2006.01)

(52) U.S. Cl.
CPC ......... *H02G 11/02* (2013.01); *B60R 16/0215* (2013.01); *H01B 7/08* (2013.01)

(58) Field of Classification Search
CPC .................................................. H02G 11/02

USPC ....................................................... 174/72 A
See application file for complete search history.

(56) References Cited

U.S. PATENT DOCUMENTS

| 2013/0248632 | A1* | 9/2013 | Hamada | B65H 75/48 |
| | | | | 242/371 |
| 2016/0059801 | A1* | 3/2016 | Katsuramaki | B60R 16/0215 |
| | | | | 191/12.2 R |
| 2017/0294767 | A1 | 10/2017 | Sano et al. | |

FOREIGN PATENT DOCUMENTS

JP 2017-189040 A 10/2017

* cited by examiner

*Primary Examiner* — Stanley Tso
(74) *Attorney, Agent, or Firm* — Kenealy Vaidya LLP

(57) ABSTRACT

A flat cable winding device includes a case, a flat cable guide portion provided in the case and that introduces the flat cables into the case separately, a rotary table that is rotatable around a central shaft portion, a biasing unit that rotates and urges the rotary table in a winding direction of flat cables, a plurality of rollers that are rotatable around the central shaft portion on the rotary table, a separation guide path that guides the flat cables introduced into the case from the flat cable guide portion to the winding start position separately, and a slack absorption unit provided in the separation guide path and that absorbs slack of a flat cable located at an inner peripheral side.

4 Claims, 6 Drawing Sheets

FLAT CABLE WINDING DEVICE AND FLAT CABLE ROUTING STRUCTURE

CROSS REFERENCE TO RELATED APPLICATIONS

This application is based on Japanese Patent Application (No. 2018-180549) filed on Sep. 26, 2018, the contents of which are incorporated herein by reference.

BACKGROUND OF THE INVENTION

1. Field of the Invention

The present invention relates to a flat cable winding device that stacks and winds a plurality of flat cables and a flat cable routing structure including the flat cable winding device.

2. Description of the Related Art

A vehicle such as an automobile includes a flat cable routing structure that connects a device on a movable body such as a slide seat or a slide door to a device such as a control device on a vehicle body by a plurality of flat cables to enable transmission of control signals and power supply. Such routing structure includes a flat cable winding device that winds excess length parts (surplus length parts) of the flat cables formed accompanying the slide of the movable body so that the flat cables do not interfere with the surroundings. Such flat cable winding device, which winds one end of a flat cable and feeds the other end of the flat cable, may include a plurality of flat cables stacked and wound therein.

FIG. 4 is an example of a winding device in the related art. A flat cable winding device 101 includes a central shaft portion 103 to which one end portions of a plurality of stacked flat cables 102 are fixed, a rotary table (also referred to as rotor) 104 that is rotatable around the central shaft portion 103, a plurality of rotatable rollers 105 on the rotary table 104 around the central shaft portion 103, and a biasing unit (not shown) such as a spring that rotates and biases the rotary table 104 in a winding direction R of flat cables.

With rotation of the rotary table 104 in the winding direction R, the flat cable winding device 101 inverts one end side of the flat cables 102 guided into a case (not shown) of the winding device by a roller 105A of the plurality of rotatable rollers 105 and winds the one end side around the outer periphery of the central shaft portion 103 as well as around outer peripheries of the plurality of rotatable rollers 105. On the other hand, when the other end side of the flat cables 102 is pulled accompanying the slide of a movable body, the rotary table 104 rotates in the direction opposite to the winding direction R, so that the flat cables 102 wound around the outer periphery of the central shaft portion 103 and the outer peripheries of the plurality of rollers 105 are released and fed out of the case of the winding device.

The plurality of flat cables 102 wound along the rollers 105 has a linear inner periphery and approaches an arc as it goes to the outer periphery and thus slack occurs. As shown in FIG. 5, the slack occurs between the winding device 101 and a movable body 106 due to a difference in wire length (wire length difference that the inner periphery is longer than the outer periphery) between the flat cable 102 on the inner peripheral side and a flat cable on the outer peripheral side during winding. This slack part of the flat cable 102 may interfere with and damage the surroundings.

Therefore, a flat cable routing structure as shown in FIG. 6 is proposed to remove the slack of the flat cable located at the inner peripheral side that occurs during winding.

A flat cable routing structure 210, which is described in JP-A-2017-189040, includes a plurality of flat cables 220, a winding device 230 that winds the flat cables 220 in a stacked state, and a slide protector 240 that is provided at an end portion of the flat cables 220 pulled out from the winding device 230 and joined to a power supply target device 250. The flat cable routing structure 210 further includes, in the slide protector 240, a slack absorption unit 260 for the flat cables 220.

As shown in FIG. 7, the slack absorption unit 260 includes a wire length difference accommodating case 261 that accommodates a wire length difference part in the vicinity of the end portion of the flat cables 220, and a curved portion 263 that is curved in a direction opposite to the winding direction via the winding device 230 for the wire length difference part of the flat cables 220 in the wire length difference accommodating case 261.

In the flat cable routing structure in the related art, the slack absorption unit is provided in the slide protector that is joined to a movable body. For this reason, the configuration on the moving body side may be complicated.

SUMMARY OF THE INVENTION

The present invention is made in view of the above-described circumstance, and an object thereof is to provide a flat cable winding device capable of removing slack occurring in a flat cable on an inner peripheral side during winding of a plurality of flat cables while simplifying a configuration on a moving body side, and a flat cable routing structure including the flat cable winding device.

The above-described object of the present disclosure is achieved by below-described structures.

[1] A flat cable winding device in which a plurality of flat cables are wound in a stacked state whose one ends are connected to a central shaft portion of the flat cable winding device and other ends of the flat cables are feedable, the flat cable winding device including:
  a case configured to accommodate the wound flat cables;
  a flat cable guide portion provided in the case and configured to introduce the plurality of flat cables into the case separately;
  a rotary table that is rotatable around the central shaft portion;
  a biasing unit configured to rotate and urge the rotary table in a winding direction of flat cables;
  a plurality of rollers that are rotatable around the central shaft portion on the rotary table and configured to wind one end sides of the plurality of flat cables in a stacked state by rotation of the rotary table in the winding direction;
  a separation guide path that is provided between the flat cable guide portion and a winding start position of the plurality of rollers for the plurality of flat cables and configured to guide the flat cables introduced into the case from the flat cable guide portion to the winding start position in a state that the plurality of flat cables are separated to each other; and
  a slack absorption unit provided in the separation guide path and configured to absorb slack of a flat cable located at an inner peripheral side among the flat cables when the flat cables are wound around the plurality of rollers.

[2] For example, in the flat cable winding device according to the item [1], the separation guide path includes a plurality of guide members configured to guide the plurality of flat cables guided from the flat cable guide portion to the winding start position; and the slack absorption unit includes:

a movable guide member among the plurality of guide members that is movable in a direction intersecting a flat surface of the flat cable located at the inner peripheral side when the flat cables are stacked and wound around the plurality of rollers; and an elastic member configured to apply a biasing force to the movable guide member and apply tension to the flat cable located at the inner peripheral side via the movable guide member.

[3] For example, in the flat cable winding device according to the item [2], the plurality of guide members are constituted by guide rollers.

[4] A flat cable routing structure including:

a plurality of flat cables whose first end portions are connected to a moving body which reciprocates with respect to a fixed body; and the flat cable winding device according to any one of the items [1] to [3] that is provided at second end portions of the plurality of flat cables opposite to the first end portions and configured to wind the plurality of flat cables pulled out by sliding of the movable body.

According to the flat cable winding device having the configuration in (1), the separation guide path provided in the case of the winding device guides the flat cables guided into the case from the flat cable guide portion separately to the winding start position of the rollers. The slack absorption unit provided in the intermediate part of the separation guide path absorbs the slack of the flat cable on the inner peripheral side that is generated when the plurality of flat cables are stacked and wound. Therefore, an adverse effect due to the slack of the flat cable can be eliminated. Particularly, the slack absorption unit is provided in the case of the winding device, and accordingly the slack of the flat cable on the inner peripheral side can be prevented from coming out of the case of the winding device. Therefore, it is not necessary to provide a slack absorption unit near the slide protector that slides together with a movable body and the configuration of the movable body can be simplified. Further, it is possible to prevent excess stress from being applied to the flat cables since there is no difference in wire length (no slack) therebetween when the flat cables are guided out of the case of the winding device to the outside.

According to the flat cable winding device having the configuration in (2), the flat cables are guided to the winding start position of the rollers by the guide members provided in the separation guide path. Accordingly, the plurality of flat cables can be separately guided to the rollers. Further, the slack can be removed with a simple configuration, since the member that guides the flat cable on the inner peripheral side is the movable guide member of the guide members and the tension for removing the slack is applied to the flat cable on the inner peripheral side by an elastic member via the movable guide member.

According to the flat cable winding device having the configuration in (3), the guide members are constituted by a guide roller. Therefore, the slack can be removed with a simple configuration while the flat cables are wound or fed out by the flat cable winding device further smoothly.

According to the flat cable routing structure having the configuration in (4), the slack absorption unit provided in the case of the winding device absorbs the slack of the flat cable on the inner peripheral side that is generated when the plurality of flat cables are stacked and wound. Therefore, an adverse effect due to the slack of the flat cable can be eliminated. Particularly, since the slack of the flat cable on the inner peripheral side can be prevented from coming out of the case of the winding device, it is not necessary to provide a slack absorption unit near the slide protector side that slides together with a movable body and the configuration of the movable body can be simplified. Further, no excess stress is applied to the flat cables since there is no difference in wire length (no slack) therebetween when the flat cables are guided out of the case of the winding device to the outside.

According to the present invention, slack occurring in a flat cable on an inner peripheral side can be removed during winding of a plurality of flat cables while simplifying a configuration on a moving body side.

The present invention is briefly described as above. Details of the present invention are further clarified by reading a mode for carrying out the present invention described below (hereinafter, referred to as "embodiment") with reference to the accompanying drawings.

BRIEF DESCRIPTION OF THE DRAWINGS

FIGS. 3A and 3B are explanatory views of operation of the flat cable winding device, in which FIG. 3A is a plan view showing a state of feeding flat cables, and FIG. 3B is a plan view showing a state of winding flat cables;

DETAILED DESCRIPTION OF THE EXEMPLARY EMBODIMENTS

A specific embodiment according to the present invention is described with reference to drawings.

Figure 1:
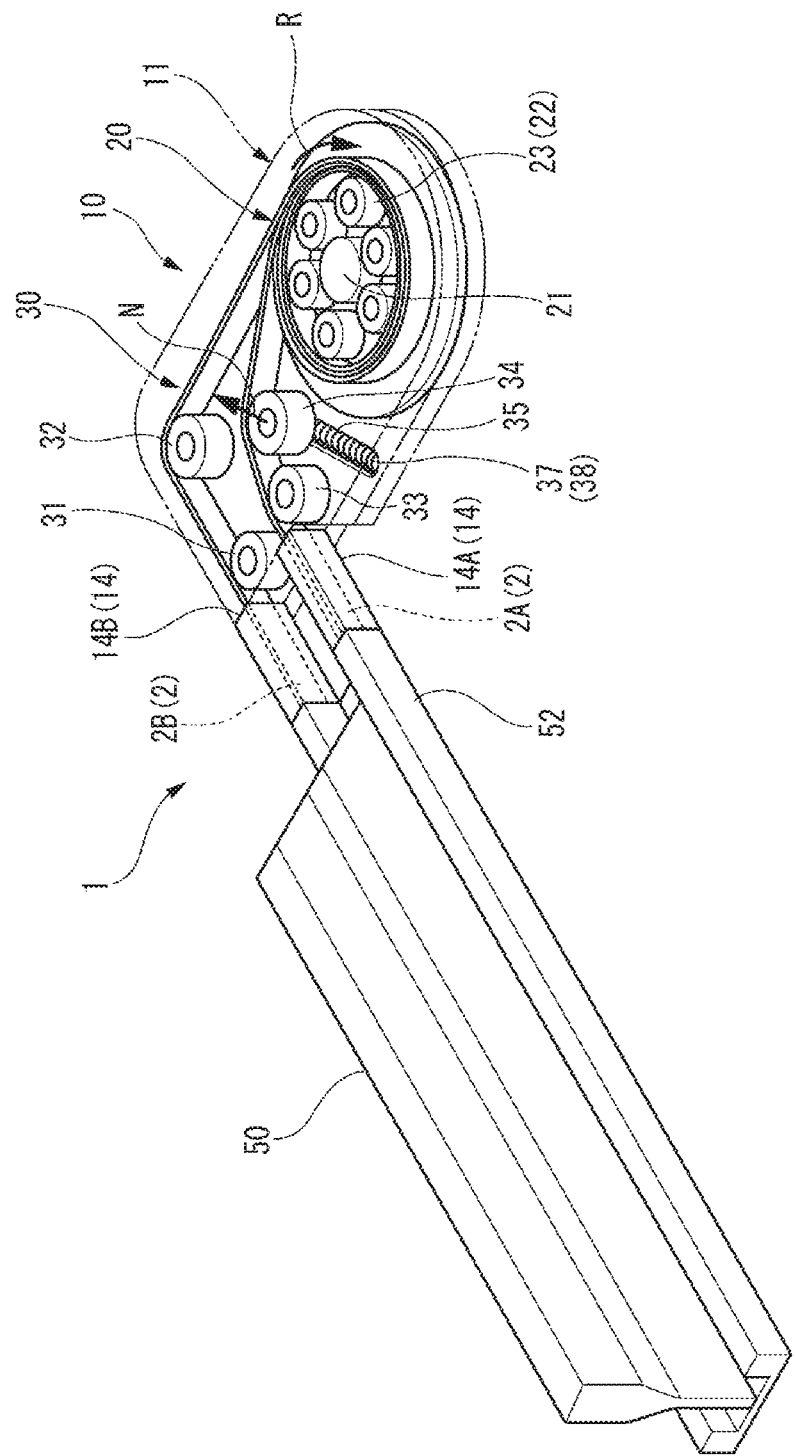
FIG. 1 is a perspective view showing a schematic configuration of a flat cable winding device and a flat cable routing structure according to an embodiment of the present invention.
Figure 2:
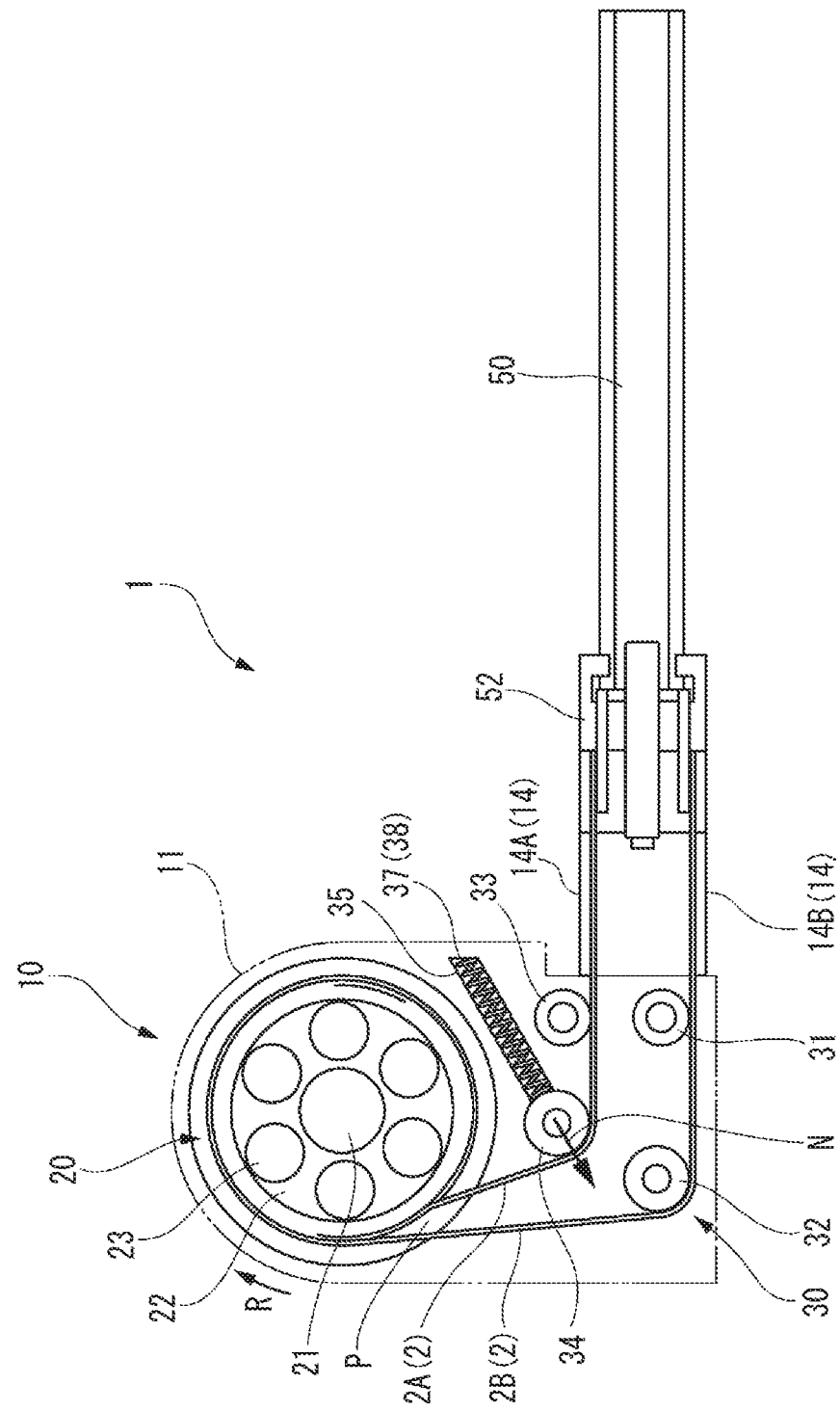
FIG. 2 is a plan view showing the schematic configuration of the flat cable winding device and the flat cable routing structure.

FIG. 1 is a perspective view showing a schematic configuration of a flat cable winding device and a flat cable routing structure according to the embodiment of the present invention. FIG. 2 is a plan view showing the schematic configuration of the flat cable winding device and the flat cable routing structure.

As shown in FIGS. 1 and 2, a flat cable routing structure 1 in this embodiment is a structure in an automobile or the like, which supplies power to a power supply object 50 such as an electronic device provided on a slide body (movable body) such as a slide seat or a slide door that is slidable with respect to the vehicle in the vehicle front-rear direction.

The flat cable routing structure 1 is installed in the vicinity of a slide rail that slidably supports the slide body. The slide rail extends in the front-rear direction of the vehicle so that the slide body slides in the front-rear direction of the vehicle.

To the slide body, a slide protector (movable body) 52 is joined and slides together with the slide body or the power supply object 50.

The flat cable routing structure 1 includes a flat cable winding device 10 in which a plurality of (two in the present embodiment) flat cables 2 (2A, 2B) is wound whose one end sides are connected thereto and the other end sides are feedable therefrom. The other end sides of the flat cables 2 are connected to the power supply object 50 by a connector through the slide protector 52.

The flat cable winding device 10 is fixed on a vehicle body side. The vehicle body is a fixed body. Therefore, the slide protector 52 reciprocates between a separated position where the flat cables 2 are fed out and separated from the flat cable winding device 10, and a close position where the flat cables 2 are wound and come close to the flat cable winding device 10.

The flat cables 2 are sufficiently longer than a slide distance of the slide body such as a slide seat. The other end sides of the flat cables 2 pass through the inside of the flat cable winding device 10 and are drawn out to the outside to connect a connector on the vehicle body side. The flat cables 2, which are conductors covered with a resin, are thin strip plates having flexibility in the thickness direction (direction intersecting the flat surface). The width direction of the flat cables 2 is the vertical direction.

The flat cable winding device 10 winds the flat cables 2 as the slide protector 52 approaches, and feeds the flat cables 2 as the slide protector 52 is separated. Accordingly, excess length parts of the flat cables 2 accompanying the slide of the slide body are wound so that the flat cables 2 do not interfere with the surroundings.

The flat cable winding device 10 includes a case 11 formed of a synthetic resin that accommodates the wound flat cables 2. In the case 11, a winding unit 20 is provided on one end side and a separation guide path 30 is provided on the other end side.

On a side surface portion of the other end side of the case 11, two flat cable guide portions 14 (14A, 14B) that introduce two flat cables 2 (2A, 2B) into the case 11 are provided in the same direction toward the slide protector 52. The two flat cable guide portions 14A, 14B are provided as separate parallel insertion holes in the present embodiment; however, they may be provided by dividing one insertion hole.

The winding unit 20 is inside the case 11 at a position away from the flat cable guide portions 14. The winding unit 20, which is upright on a top surface of a bottom plate of the case 11, includes a central shaft portion 21 to which one end portions of the plurality of stacked flat cables 2A, 2B are fixed, and a rotary table 22 that is rotatable around the central shaft portion 21 inside the case 11. The winding unit 20 further includes a biasing unit (not shown) such as a spiral spring or a coil spring that rotates and biases the rotary table 22 in the winding direction R of flat cables, and a plurality of rollers 23 provided on the rotary table 22. The plurality of rollers 23, which are rotatable around the central shaft portion 21 on the rotary table 22, wind one end sides of the plurality of flat cables 2 in a stacked state by rotation of the rotary table 22 in the winding direction R.

The separation guide path 30 is provided in an internal space of the case 11 between the flat cable guide portions 14 and a winding start position P when the plurality of flat cables 2 is wound by the plurality of rollers 23 in a stacked state. The separation guide path 30 guides the flat cables 2 guided into the case 11 from the flat cable guide portions 14 to the winding start position P separately. In an intermediate part of the separation guide path 30 in the case 11, a slack absorption unit 38 is provided to absorb slack of the flat cable 2A that is on an inner peripheral side when the flat cables 2 are stacked and wound around the plurality of rollers 23.

The separation guide path 30 includes a plurality of guide rollers 31 to 34 that separately turns the plurality of flat cables 2 guided from the flat cable guide portions 14 into a direction orthogonal to the guide direction and guides the plurality of flat cables 2 to the winding start position P of the winding unit 20.

The slack absorption unit 38 includes the movable roller 34 of the two rollers 33, 34 that guide the flat cable 2A on the inner peripheral side, and a slack absorption spring 37 that biases the movable roller 34. The movable roller 34 guides the flat cable 2A on the inner peripheral side along a bent path and is movable in a direction orthogonal to the flat surface of the flat cable 2A. Specifically, a linear slide groove 35 is formed in the case 11 along a straight line halving the bending angle of the flat cable 2A that is in rolling contact with the movable roller 34, so that the rotation support shaft of the movable roller 34 slides along the slide groove 35. The movable roller 34 is biased by a slack absorption spring (compression spring) 37 inside a bent portion of the slide groove 35 as indicated by an arrow N toward the outside of the bent portion. By applying an urging force to the movable roller 34 in this manner, tension for removing the slack can be applied to the flat cable 2A on the inner peripheral side via the movable roller 34. The moving direction of the movable roller 34 may not be perpendicular to the flat surface of the flat cable 2A, and may be any direction as long as the tension for removing the slack can be applied to the flat cable 2A on the inner peripheral side.

Operation is described next. In the flat cable winding device 10, the rotary table 22 is rotated in the winding direction R by an urging unit, so that the flat cables 2 are wound along the plurality of rollers 23. Accordingly, the flat cables 2 are pulled into the case 11 and accommodated therein.

When the flat cables 2 are pulled out, the rotary table 22 is rotated in a direction opposite to the winding direction R against an urging force of the urging unit. Accordingly, the flat cables 2 wound along the rollers 23 are fed out from the cable guide portions 14.

During winding, the two flat cables 2A, 2B wound along the rollers 23 have a linear inner periphery among the rollers 23 and an almost circular outer periphery that is bulged outward. That is, in the winding unit 20, the flat cable 2B on the outer peripheral side loosens outward with respect to the flat cable 2A on the inner peripheral side. Accordingly, the flat cable 2A on the inner peripheral side is longer than the flat cable 2B on the outer peripheral side at a position before being guided by the winding unit 20, which results in a wire length difference. For this reason, when the other ends of the flat cables 2A, 2B are fixed at the same position, slack occurs in the flat cable 2A on the inner peripheral side before the winding unit 20.

Figure 3:
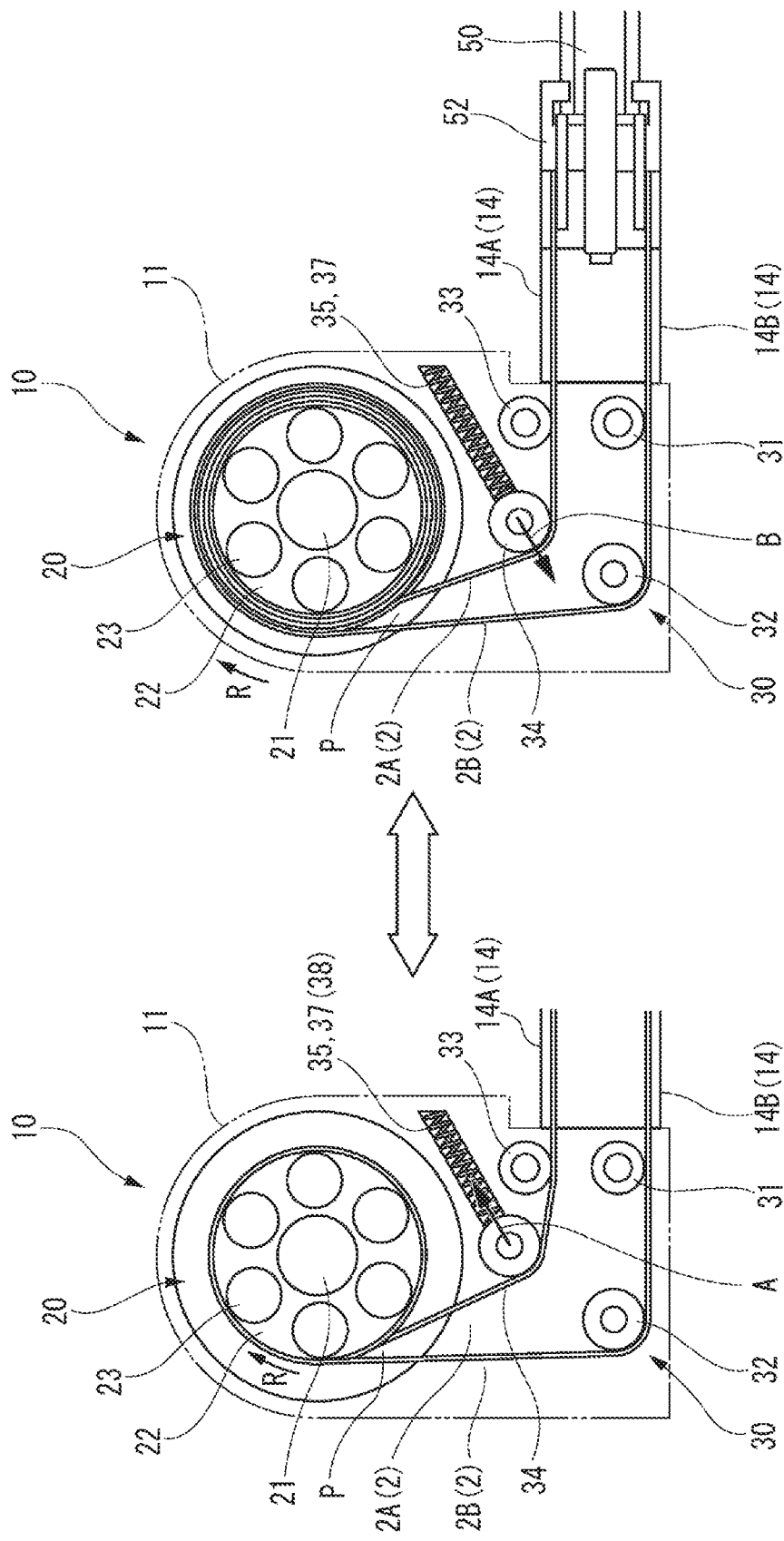
Figure 4:
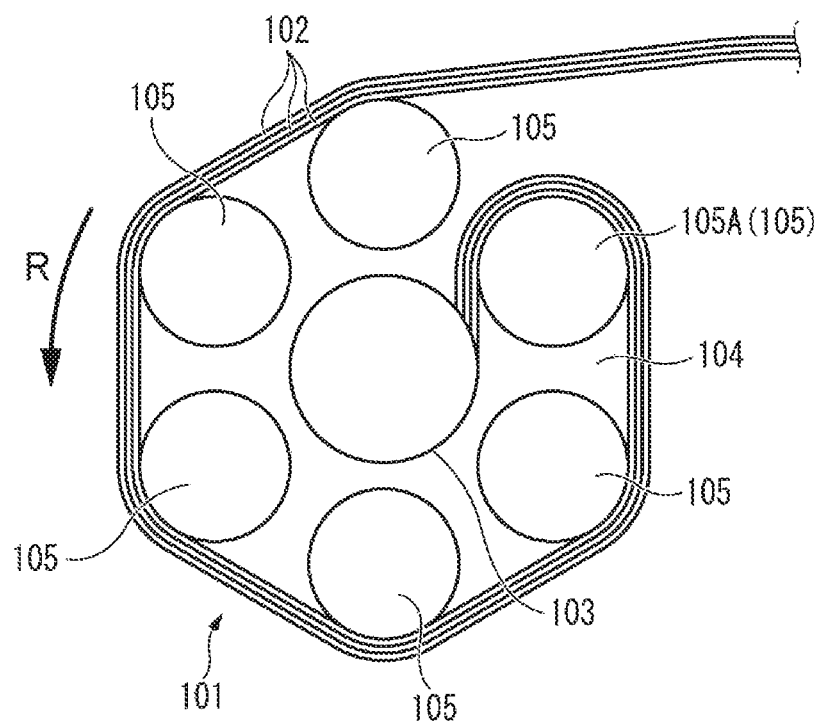
FIG. 4 is a plan view showing a schematic configuration of a flat cable winding device in the related art.
Figure 5:
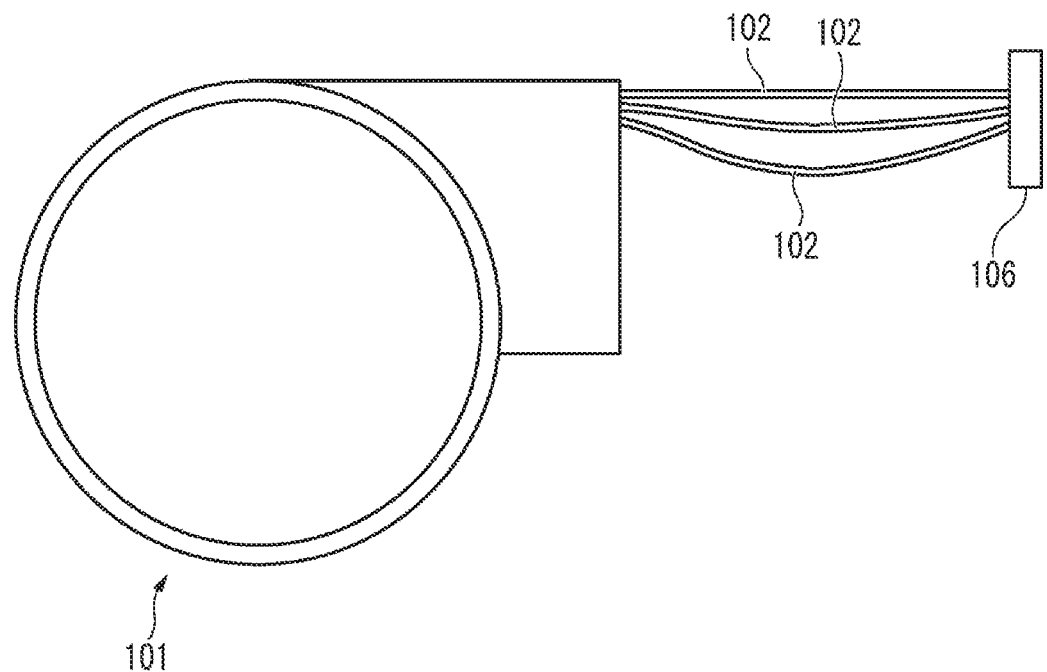
FIG. 5 is a plan view showing a problem of the flat cable winding device.
Figure 6:
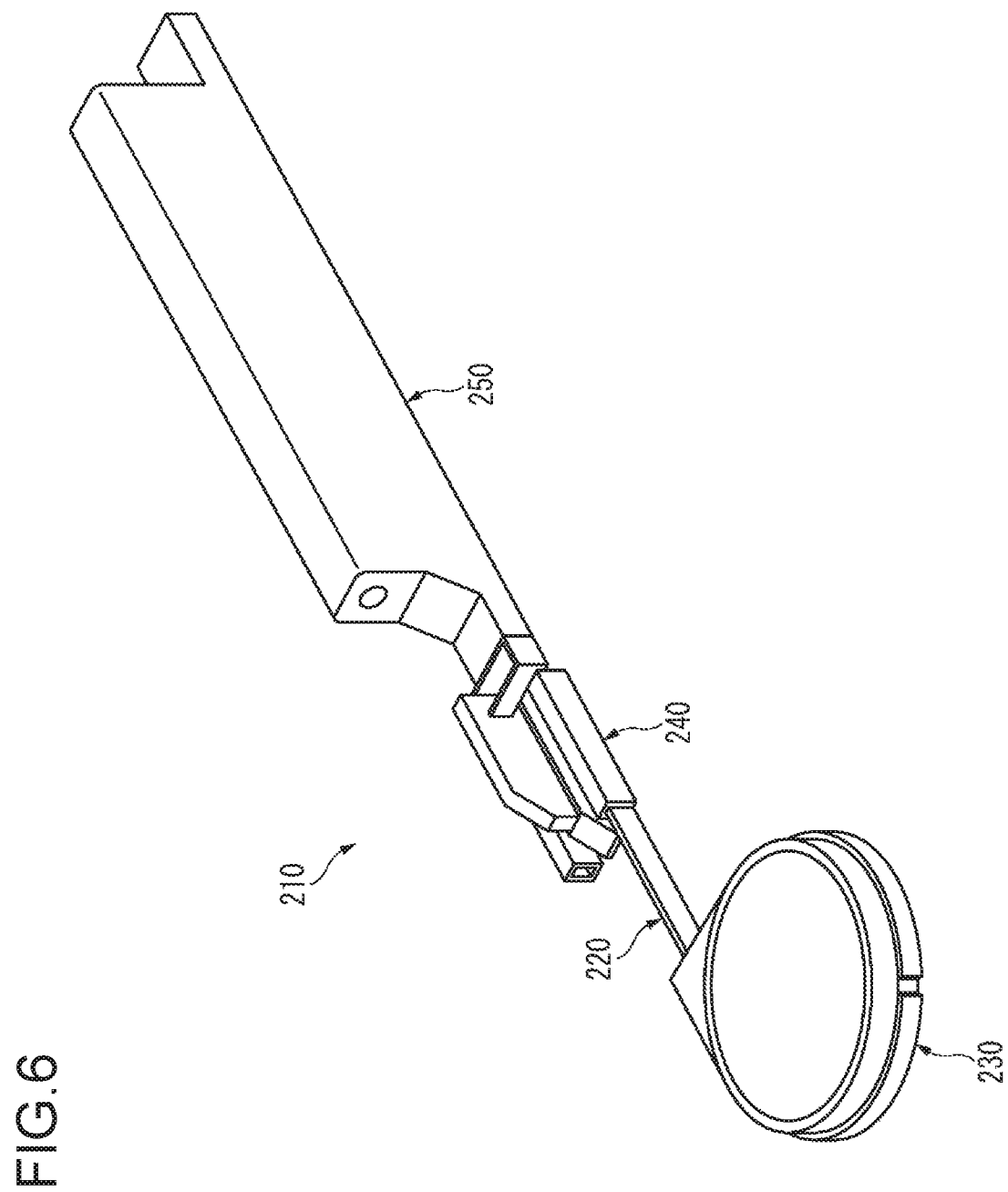
FIG. 6 is a perspective view of a flat cable routing structure in the related art described in JP-A-2017-189040.
Figure 7:
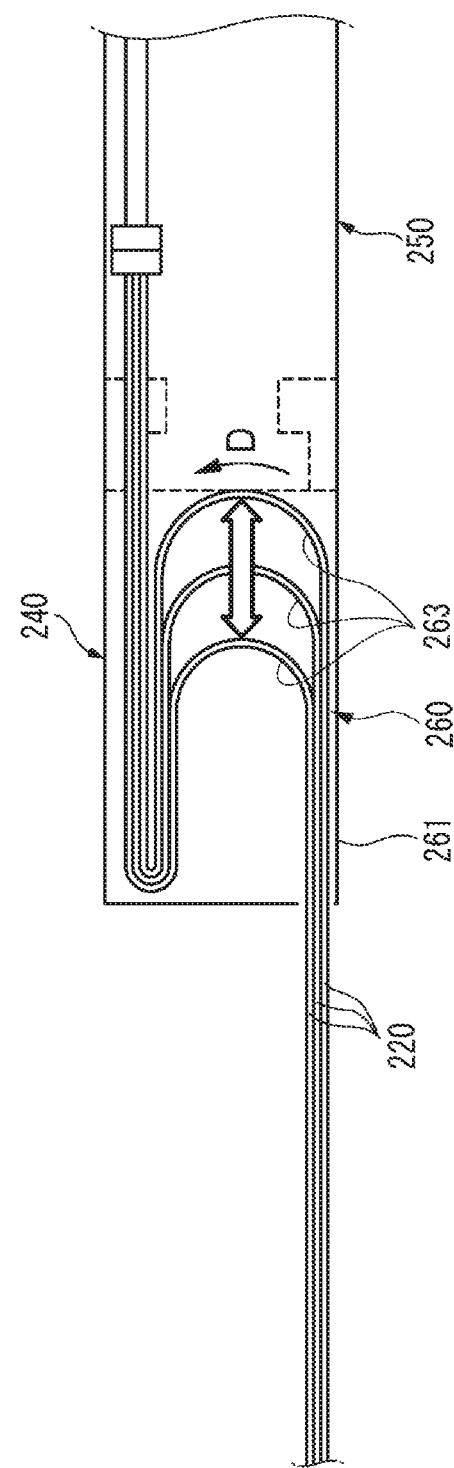
FIG. 7 is a plan view showing an internal configuration of a slide protector in the flat cable routing structure.

However, in the flat cable winding device 10 according to the present embodiment, the roller that bends and guides the flat cable 2A in which the slack occurs is the movable roller 34. As shown in FIG. 3B, the roller slides in a direction B by an urging force of the spring 37 along the slide groove 35 in the case 11. With the spring 37, the flat cable 2A is pulled toward the winding unit 20 while being tensioned in a direction in which the slack is absorbed. Therefore, no slack occurs in the flat cables 2A, 2B outside the case 11 of the flat cable winding device 10.

When the slide protector 52 slides away from the flat cable winding device 10 and the other end sides of the flat cables 2 are pulled, the rotary table 22 rotates in a direction opposite to the winding direction R. Then, the flat cables 2 wound around the outer periphery of the central shaft portion 21 and the outer peripheries of the plurality of rollers 23 are released and fed out to the outside of the case 11 of the flat cable winding device 10.

At this time, as shown in FIG. 3A, the movable roller 34 slides in a direction of an arrow A against the urging force of the spring 37 in response to the tension acting on the flat cable 2A on the inner peripheral side. Accordingly, the flat cable 2A on the inner peripheral side is smoothly fed out to the outside of the case 11 without slack.

As described above, according to the flat cable winding device 10 and the flat cable routing structure 1 of the present embodiment, the separation guide path 30 in the case 11 of the winding device 10 guides the flat cables 2 (2A, 2B) guided into the case 11 from the flat cable guide portions 14 separately to the winding start position P of the rollers 23. The slack absorption unit 38 provided in the intermediate part of the separation guide path 30 absorbs the slack of the flat cable 2A on the inner peripheral side that is generated when the plurality of flat cables 2 are stacked and wound. Therefore, an adverse effect due to the slack of the flat cable 2A can be eliminated.

Particularly, the slack absorption unit 38 is provided in the case 11 of the winding device, and accordingly the slack of the flat cable 2A on the inner peripheral side can be prevented from coming out of the case 11 of the winding device. Therefore, it is not necessary to provide a slack absorption unit near the slide protector 52 that slides together with a movable body and the configuration of the movable body can be simplified. Further, no excess stress is applied to the flat cables 2A, 2B since there is no difference in wire length (no slack) therebetween when the flat cables 2A, 2B are guided out of the case 11 of the winding device to the outside.

The flat cables 2 (2A, 2B) are turned and guided to the winding start position P of the rollers 23 by the guide rollers 31 to 34 provided in the separation guide path 30. Accordingly, the plurality of flat cables 2A, 2B can be separately guided to the rollers 23 with a simple configuration. Further, the slack can be removed with a simple configuration, since the roller that guides the flat cable 2A on the inner peripheral side is the movable roller 34 of the guide rollers 31 to 34 and the tension for removing the slack is applied to the flat cable 2A on the inner peripheral side by an elastic member such as the spring 37 via the movable roller 34.

The present embodiment describes two stacked flat cables as an example of a plurality of stacked flat cables; however, the present invention is not limited thereto and three or more flat cables may be stacked.

The present embodiment describes a case where the guide rollers 31 to 34 are provided in the separation guide path 30; however, a guide member may be not necessarily rotatable around the rotary table 22 as long as the flat cables 2A, 2B can be turned from the flat cable guide portions 14 and guided to the winding start position P of the rollers 23.

The embodiment described above is merely a representative of the present invention, and the present invention is not limited thereto. That is, various modifications can be made without departing from the gist of the present invention.

Herein features of the flat cable winding device and the flat cable routing structure according to the embodiment of the present invention described above are briefly summarized in the following [1] to [4].

[1] A flat cable winding device (10) in which a plurality of flat cables (2) are wound in a stacked state whose one ends are connected to a central shaft portion (21) of the flat cable winding device and other ends of the flat cables are feedable. The flat cable winding device includes:

a case (11) configured to accommodate the wound flat cables (2);

a flat cable guide portion (14) that is provided in the case (11) and configured to introduce the plurality of flat cables (2) into the case (11) separately;

a rotary table (22) that is rotatable around the central shaft portion (21);

a biasing unit configured to rotate and urge the rotary table (22) in a winding direction (R) of flat cables (2);

a plurality of rollers (23) that are rotatable around the central shaft portion (21) on the rotary table (22) and configured to wind one end sides of the plurality of flat cables (2) in a stacked state by rotation of the rotary table (22) in the winding direction (R);

a separation guide path (30) that is provided between the flat cable guide portion (14) and a winding start position (P) of the plurality of rollers (23) for the plurality of flat cables (2) and configured to guide the flat cables (2) introduced into the case (11) from the flat cable guide portion (14) to the winding start position (P) in a state that the plurality of flat cables are separated to each other; and a slack absorption unit (38) provided in the separation guide path (30) and configured to absorb slack of a flat cable (2A) located at an inner peripheral side among the flat cables when the flat cables (2) are wound around the plurality of rollers (23).

[2] In the flat cable winding device according to [1], the separation guide path (30) includes a plurality of guide members (guide rollers 31 to 34) configured to guide the plurality of flat cables (2) guided from the flat cable guide portion (14) to the winding start position (P), and the slack absorbing portion (38) includes:

a movable guide member (movable roller 34) among the plurality of guide members (guide rollers 31 to 34) that is movable in a direction intersecting a flat surface of the flat cable (2A) located at the inner peripheral side when the flat cables (2) are stacked and wound around the plurality of rollers (23), and an elastic member (spring 37) configured to apply a biasing force to the movable guide member (movable roller 34) and apply tension to the flat cable (2A) located at the inner peripheral side via the movable guide member (movable roller 34).

[3] In the flat cable winding device [2], the plurality of guide members (guide roller 31 to 34) are constituted by guide rollers.

[4] A flat cable routing structure (1) includes:

a plurality of flat cables (2) whose first end portions are connected to a moving body (slide protector 52) which reciprocates with respect to a fixed body; and the flat cable winding device (10) according to any one of [1] to [3] that is provided at second end portions of the plurality of flat cables (2) opposite to the first end portions and configured to wind the plurality of flat cables (2) pulled out by sliding of the movable body (slide protector 52).

What is claimed is:

1. A flat cable winding device in which a plurality of flat cables are wound in a stacked state whose one ends are connected to a central shaft portion of the flat cable winding device and other ends of the flat cables are feedable, the flat cable winding device comprising:
- a case configured to accommodate the wound flat cables;
- a flat cable guide portion provided in the case and configured to introduce the plurality of flat cables into the case separately;
- a rotary table that is rotatable around the central shaft portion;
- a biasing unit configured to rotate and urge the rotary table in a winding direction of flat cables;
- a plurality of rollers that are rotatable around the central shaft portion on the rotary table and configured to wind one end sides of the plurality of flat cables in a stacked state by rotation of the rotary table in the winding direction;
- a separation guide path that is provided between the flat cable guide portion and a winding start position of the plurality of rollers for the plurality of flat cables and configured to guide the flat cables introduced into the case from the flat cable guide portion to the winding start position in a state that the plurality of flat cables are separated to each other; and
- a slack absorption unit provided in the separation guide path and configured to absorb slack of a flat cable located at an inner peripheral side among the flat cables when the flat cables are wound around the plurality of rollers.

2. The flat cable winding device according to claim 1,
wherein the separation guide path includes a plurality of guide members configured to guide the plurality of flat cables guided from the flat cable guide portion to the winding start position; and
wherein the slack absorption unit includes:
- a movable guide member among the plurality of guide members that is movable in a direction intersecting a flat surface of the flat cable located at the inner peripheral side when the flat cables are stacked and wound around the plurality of rollers; and
- an elastic member configured to apply a biasing force to the movable guide member and apply tension to the flat cable located at the inner peripheral side via the movable guide member.

3. The flat cable winding device according to claim 2,
wherein the plurality of guide members are constituted by guide rollers.

4. A flat cable routing structure comprising:
a plurality of flat cables whose first end portions are connected to a moving body which reciprocates with respect to a fixed body; and
the flat cable winding device according to claim 1 that is provided at second end portions of the plurality of flat cables opposite to the first end portions and configured to wind the plurality of flat cables pulled out by sliding of the movable body.

* * * * *